(12) United States Patent
Phillips et al.

(10) Patent No.: US 12,527,302 B2
(45) Date of Patent: Jan. 20, 2026

(54) LEGS FOR HEIGHT-ADJUSTABLE BROODER HEATING PLATES

(71) Applicants: Tyler Phillips, Germantown, MD (US); William Stefany, Gaithersburg, MD (US)

(72) Inventors: Tyler Phillips, Germantown, MD (US); William Stefany, Gaithersburg, MD (US)

(73) Assignee: RentACoop, LLC, Germantown, MD (US)

( * ) Notice: Subject to any disclaimer, the term of this patent is extended or adjusted under 35 U.S.C. 154(b) by 0 days.

(21) Appl. No.: 18/921,459

(22) Filed: Oct. 21, 2024

(65) Prior Publication Data

US 2025/0040519 A1 Feb. 6, 2025

(51) Int. Cl.
*A01K 31/19* (2006.01)
*A01K 31/20* (2006.01)

(52) U.S. Cl.
CPC .............. *A01K 31/19* (2013.01); *A01K 31/20* (2013.01)

(58) Field of Classification Search
CPC ......... A01K 31/18; A01K 31/19; A01K 31/20
See application file for complete search history.

(56) References Cited

U.S. PATENT DOCUMENTS

| | | | | |
|---|---|---|---|---|
| 950,831 | A * | 3/1910 | Bachman | A01K 31/18 119/302 |
| 2,256,476 | A * | 9/1941 | Hawkins | A01K 31/19 248/149 |
| 2,604,875 | A * | 7/1952 | Klay | A01K 31/19 119/302 |
| 2,787,697 | A * | 4/1957 | Muehlfeld | G05D 23/27537 119/309 |
| 2,834,319 | A * | 5/1958 | Goodman | A01K 31/19 219/385 |
| 2,923,274 | A * | 2/1960 | Landgraf | A01K 31/19 119/307 |
| 3,503,379 | A * | 3/1970 | Kuhn | A01K 31/20 126/92 R |
| 10,667,498 | B2 * | 6/2020 | Bahler | A01K 31/06 |
| 11,166,439 | B2 * | 11/2021 | Portela | A01K 31/12 |

FOREIGN PATENT DOCUMENTS

| | | | | |
|---|---|---|---|---|
| CN | 106376468 A | * | 2/2017 | .......... A01K 1/0047 |
| CN | 107853212 A | * | 3/2018 | ............. A01K 31/20 |
| GB | 190907479 A | * | 8/1909 | ............. A01K 31/19 |
| GB | 398186 A | * | 9/1933 | ............. A01K 31/18 |
| GB | 2212901 A | * | 8/1989 | ............... H05B 3/26 |

* cited by examiner

*Primary Examiner* — Monica L Perry (57) ABSTRACT

A leg for a height adjustable brooder heating plate is provided. The leg includes an elongated body having an externally configured spiral winding extending from a top end to a bottom end of the elongated body, a cap configured at the top end of the elongated body, and a foot configured at the bottom end of the elongated body. The leg is insertable into a slot of a heating plate and is capable of sliding therethrough to adjust the height of the brooder heating plate by using a push button configured underside the heating plate and/or by rotating the leg engaged within the slot.

7 Claims, 7 Drawing Sheets

LEGS FOR HEIGHT-ADJUSTABLE BROODER HEATING PLATES

TECHNICAL FIELD

The present invention generally relates to brooder heaters, and more particularly to brooder heating plates. Specifically, the present invention relates to novel legs for height-adjustable brooder heating plates.

BACKGROUND

Keeping chicks warm for the first few weeks of their life is one of the essential ways to keep chicks happy and healthy. Chicks need an environment with temperatures between 95 and 100 for the first week of their life and a decrease of 5 degrees each week until they are feathered out. During this period chicks need extra heat to thrive.

Various forms of heating sources are available such as heat lamps, chick plate heaters, infrared brooder heaters, electric hen heaters, heat pads, and so on. Out of different available heating sources, chick plate heaters are relatively new heating solution for baby chicks and provide chicks with the necessary warmth for the early weeks. The chick plate heaters function by utilizing a radiant heat source embedded within a circular or rectangular plate. The plate distributes the heat evenly across its surface, mimicking the natural warmth provided by a mother hen. If the chicks do not get the necessary warmth and protection that is normally supplied by their mother hen, they tend to be sick and die. In other words, a heating plate simulates a hen keeping chicks warm and cozy beneath her feathers. Chicks stay warm by contact with the warm underside of the plate. The bottom-side surface of the heating plate is warm, but not terribly hot. One important aspect of such chick plate heaters is that their height can be adjusted to accommodate growing chicks and provide optimal warmth.

Figure 1A:
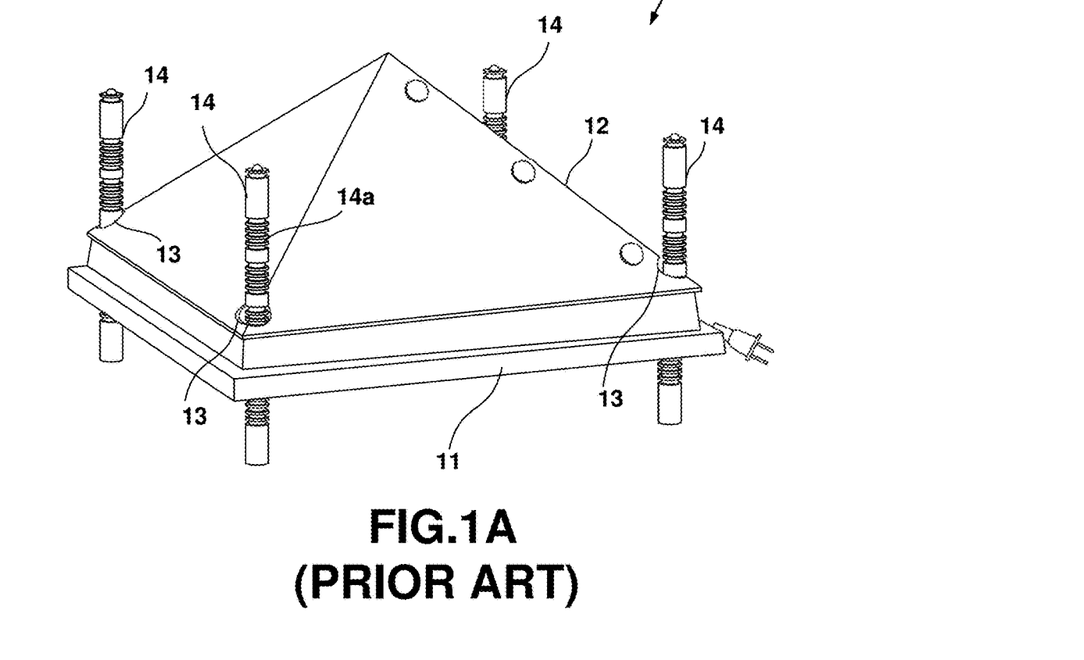
FIGS. 1A and 1B show a traditional height-adjustable brooder heating plate with the legs widely in use with the height-adjustable brooder heating plate.
Figure 1B:
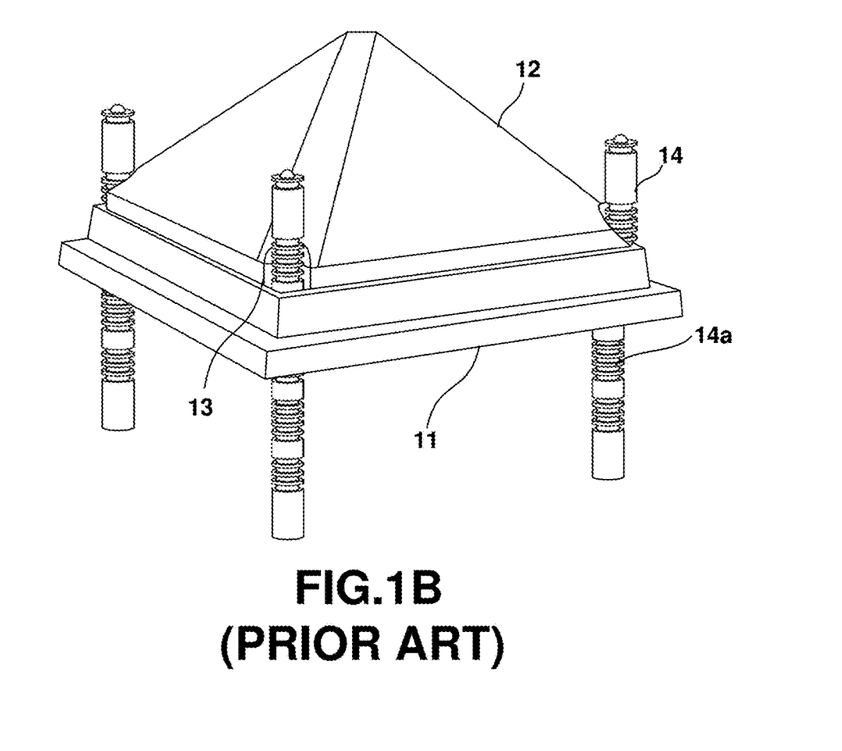

FIGS. 1A-1B shows traditional chick plate heater 10. The heater 10 comprises a heating plate 11 preferably square or rectangular. The heating plate 11 includes four slots (not seen) at its four corners. The heating plate 11 is further covered by a conical or pyramidal cover 12 having four holes 13 relatively at its four corners. Four legs 14 are then inserted through each pair of holes 13a and the slot located on the heating plate 11 and the conical or pyramidal cover 12. Each of the legs 14 as seen in FIGS. 1A-1B includes four or five sets of threads spaced-apart from each other formed by the external threads 14a. Further, the plate 11 includes a push button (not seen) configured on the plate 11 near the slot of the plate 11. The push button when pushed/activated allows a user to quickly push or pull the leg through the hole and slot pair to adjust the height of the brooder heating plate 10. In a normal state (when the push button is not pushed), an engaging member (not seen) related to the push button engages with the grooves located adjacent threads 14a along the length of the legs 14 to set the heating plate 11 to a desired height. Although the legs 14 as seen in FIGS. 1A-1B serve the purpose for which it is intended, they have their shortcomings, for example, every time we need to adjust the height of the heating plate by a few millimeters, the user needs to adjust the height by activating the push buttons. Further, the bottom or foot of each of the legs 14 tends to shrink down on the ground surface or the bedding of the brooder where the heating plate 10 is installed, making the chick plate heater 10 unstable over the time.

Thus, it is highly desirable to provide a more simplistic solution or improve leg designs that can be used with the height adjustable heating plate that would not only allow drastic height adjustment of the heating plate by making use of the push buttons but also enable smaller height adjustment by rotating the legs. Further, the improved leg configuration of the proposed design includes a flat base covering a larger surface area, that does not shrink down on the ground surface or the bedding of the brooder thereby making the brooder heating plate more stable.

SUMMARY

Before the present systems and methods, and embodiments are described, it is to be understood that this application is not limited to the particular systems, and methodologies described, as there can be multiple possible embodiments that are not expressly illustrated in the present disclosures. It is also to be understood that the terminology used in the description is for the purpose of describing the particular versions or embodiments only, and is not intended to limit the scope of the present application. Further, it is also to be understood that the terminology if not defined by the present disclosure should be construed as the general or known meaning/definition of the terminology, known to the person skilled in the art.

It is an object of the present invention to provide improved legs for use with brooder heating plates. Each of the improved legs is slidable through the plate's slot and cover hole combination and provides flexibility to not only adjust the height of the plate by pushing the push button but also by way of rotating each of the legs. The height adjustment rendered by the rotational motion of the legs provides flexibility to change the height of the heating plate by smaller distances without having to hold and play around the push buttons and then push/pull the legs.

It is an object of the present invention to provide improved legs for use with brooder heating plates that offer a higher range in terms of height adjustment when compared to traditional legs widely used with the brooder heating plates.

It is an object of the present invention to provide legs for use with brooder heating plates that do not shrink onto the ground surface or on the bedding of the brooder thereby making the heating plate more stable.

In an embodiment of the present invention, a leg for a brooder heating plate is provided. The leg includes an elongated body comprising an externally configured spiral winding extending from a top end to a bottom end of the elongated body. The spiral winding is continuously wound around the elongated body. Each of the successive spiral windings is equidistant from each other. Each pair of spiral windings around the elongated body comprises a space. The elongated body is cylindrical and hollow inside.

In the embodiment, the leg includes a cap configured at the top end of the elongated body. The cap comprises a pair of prongs extending therefrom and is insertable into the top end of the elongated body. The pair of prongs engage to a pair of engaging grooves configured within an interior wall of the elongated body in proximity to the top end.

In the embodiment, the leg further includes a foot configured at the bottom end of the elongated body. The foot comprises a base, and a post extending upwardly from the center of the base. The base is substantially flat and circularly shaped to cover a larger surface area when the leg stands on a ground surface or the bedding of a brooder. The post is insertable into the bottom end of the elongated body.

In the embodiment, the leg is insertable into a slot of a heating plate and is capable of sliding therethrough to adjust height of the brooder heating plate by using a push button configured underside the heating plate, and/or by rotating the leg engaged within the slot. The push button when pressed allows the leg to freely slide within the slot, and when depressed allows the leg inserted inside the slot to be locked. An engaging member associated with the push button engages within the space located along the length of the elongated body to provide resistance to the movement of the leg when the push button is depressed or released.

In another embodiment of the present invention, a brooder heating plate is provided. The brooder heating plate includes a heating plate functioning by utilizing a radiant heat source embedded therein. The heating plate (103) distributes the heat evenly across its surface. The heating plate (103) comprises a plurality of slots (103a).

In the embodiment, the brooder heating plate includes a protective cover configured on top of the heating plate The cover comprises a plurality of holes.

In the embodiment, the brooder heating plate includes a plurality of leg. Each of the legs includes an elongated body comprising an externally configured spiral winding extending from a top end to a bottom end of the elongated body; a cap configured at the top end of the elongated body; a foot configured at the bottom end of the elongated body. In the embodiment, the leg is insertable into a slot of a heating plate and is capable of sliding therethrough to adjust height of the brooder heating plate by using a push button configured underside the heating plate, and/or by rotating the leg engaged within the slot. The push button when pressed allows the leg to freely slide within the slot, and when depressed allows the leg inserted inside the slot to be locked. An engaging member associated with the push button engages within the space located along the length of the elongated body to provide resistance to the movement of the leg when the push button is depressed or released.

In the present invention related to a leg for a brooder heating plate, a combination of proposed spiral legs and clips activated using the push button located on the heating plate allows the legs to be inserted or put on the heating plate quickly and adjust the legs for many heights. The spiral legs also make it easier to change the height because a user doesn't have to flip the heating plate over or reach under the plate to adjust the clip.

Further, the foot provided on the legs keeps the plate in a more stable position by not allowing the legs to sink into the ground or bedding (such as hemp or pine shavings) which makes the height of the plate stay the same, unlike other conventional legs without a foot. This is a very important aspect of the proposed invention because if the legs sink too much into the bedding and the heater plate gets too low in height, then the chicks can get too hot and die or burn or they won't be able to go under the plate and they can die of getting too cold outside.

DETAILED DESCRIPTION

Before describing the present invention in detail, it should be observed that the present invention utilizes a combination of components or processes, which constitutes a height-adjustable brooder heating plate, especially novel legs for use with the brooder heating plate. Accordingly, the components or processes have been represented, showing only specific details that are pertinent for an understanding of the present invention so as not to obscure the disclosure with de/tails that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Some embodiments, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

The height-adjustable brooder heating plate and novel legs configured for use with the height-adjustable brooder heating plate will now be described with reference to the accompanying drawings, particularly FIGS. 2-7,8A-8B.

Figure 2:
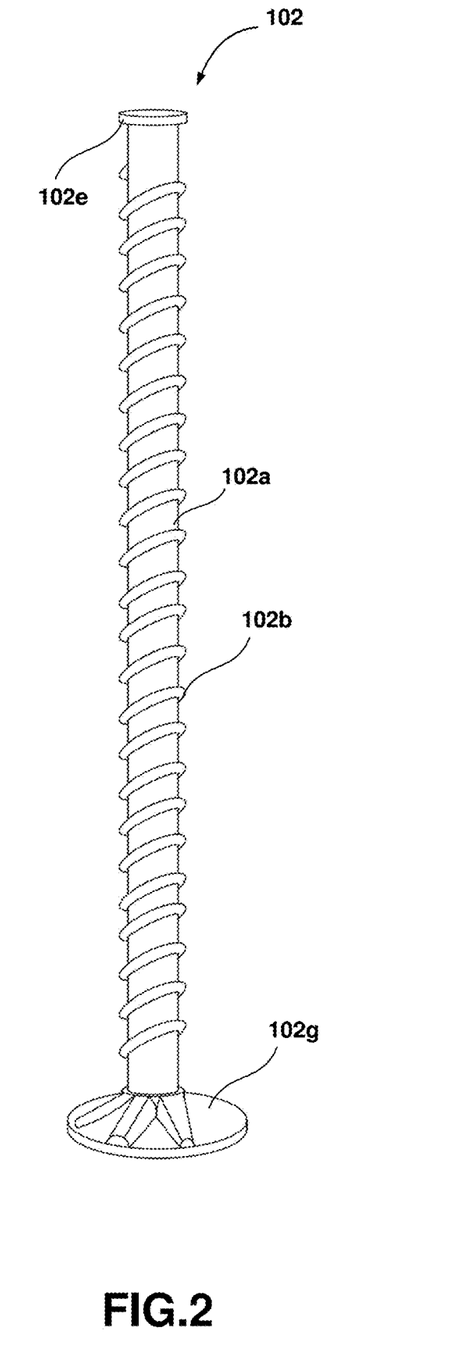
FIG. 2 shows an assembled view of an improved leg assembly that can be used with the brooder heating plate, according to an exemplary embodiment of the present invention.
Figure 3:
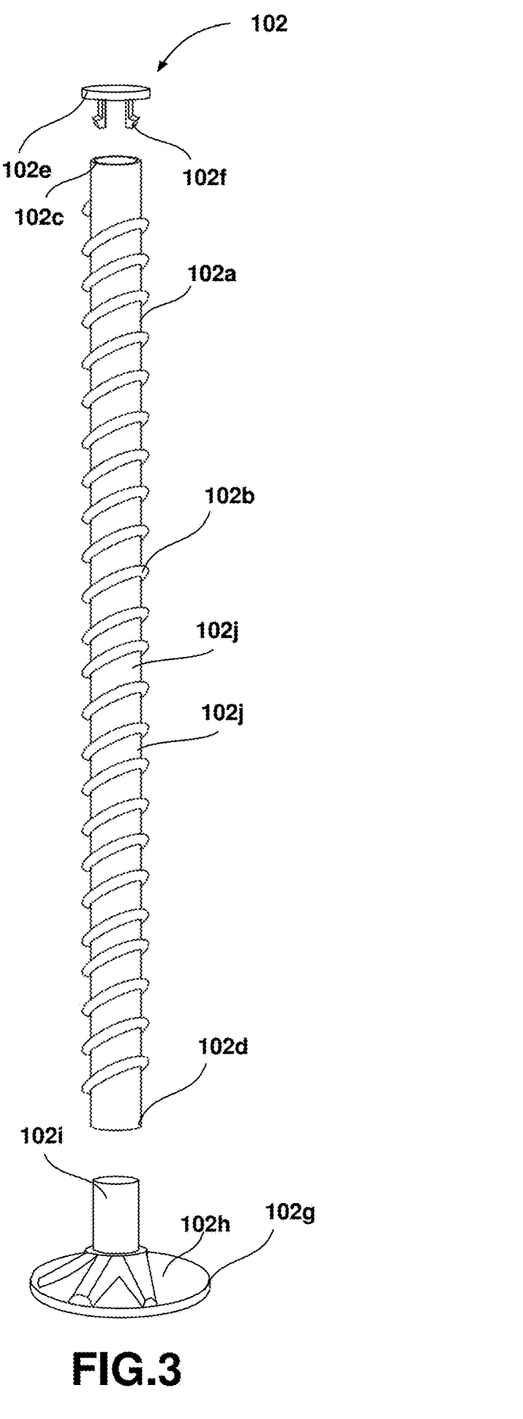
FIG. 3 shows an exploded view of the improved leg assembly of FIG. 2.

FIGS. 2 and 3 in conjunction with FIGS. 4-8 illustrate an improved leg assembly that can be used with the brooder heating plate 100. The leg assembly 102 includes an elongated body 102a, a cap 102e, and a foot 102g.

The elongated body 102a comprises an externally configured spiral winding 102b extending from a top end 102c to a bottom end 102d of the elongated body 102a. The top end 102c and the bottom end 102d are open ends. The spiral winding 102b is seen continuously wound around the body 102a. The elongated body 102a is cylindrical and may be hollow inside for receiving the cap 102e at the top end 102c and the foot 102g at the bottom end 102d. Each of the successive spiral windings 102b around the body 102a is equidistant from each other. Between each pair of spiral windings 102b there is a groove/space 102j. In an embodiment, for "n" number of spirals around the body 102a, there are (n-1) grooves/spaces. The elongated body 102a is of a predefined length and is customizable based on the need to accommodate different sizes of chicks or based on the growing needs of the chicks. In an example embodiment, the length of the elongated body 102a is chosen such that the height of the heating plate 103 may be adjusted from 1 inch to 6 inches.

The cap 102e of the leg assembly 102 is adapted to be inserted into the top end of the elongated body 102a. The cap 102e includes a pair of prongs 102f extending therefrom. The prongs 102f engage to a pair of engaging grooves (not see) configured within the interior wall of the elongated body 102a in proximity to the top end 102c.

The foot 102g includes a base 102h which is substantially flat. The base 102h in an embodiment is circular. However, it should be understood that the base 102h may be configured in many other shapes. The foot 102g further includes a post 102i extending upwardly from the center of the base 102h. The foot 102g is inserted into the bottom end 102d of the elongated body 102a using the post 102i. The foot 102g portion of the leg assembly 100 is advantageous as it doesn't shrink into the bedding of the brooder or into the surface where the legs 102 stand. The foot 102g (specifically the base 102h) provides a larger surface area when it contacts the ground surface or the bedding of the brooder thus it doesn't shrink easily and provides more stability to the heating plate 100.

Figure 4:
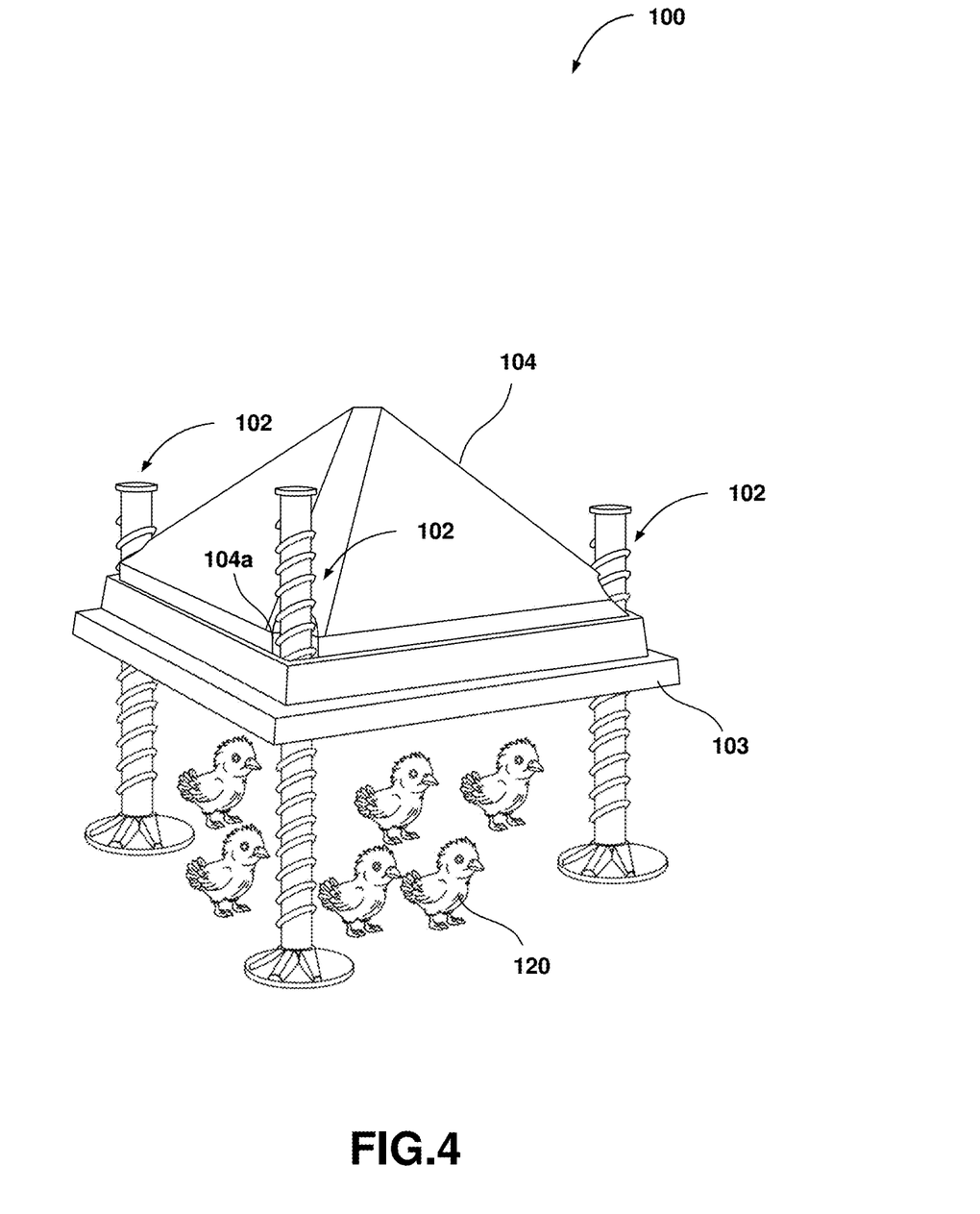
FIG. 4 shows a brooder heating plate that uses the proposed leg of FIG. 2.
Figure 5:
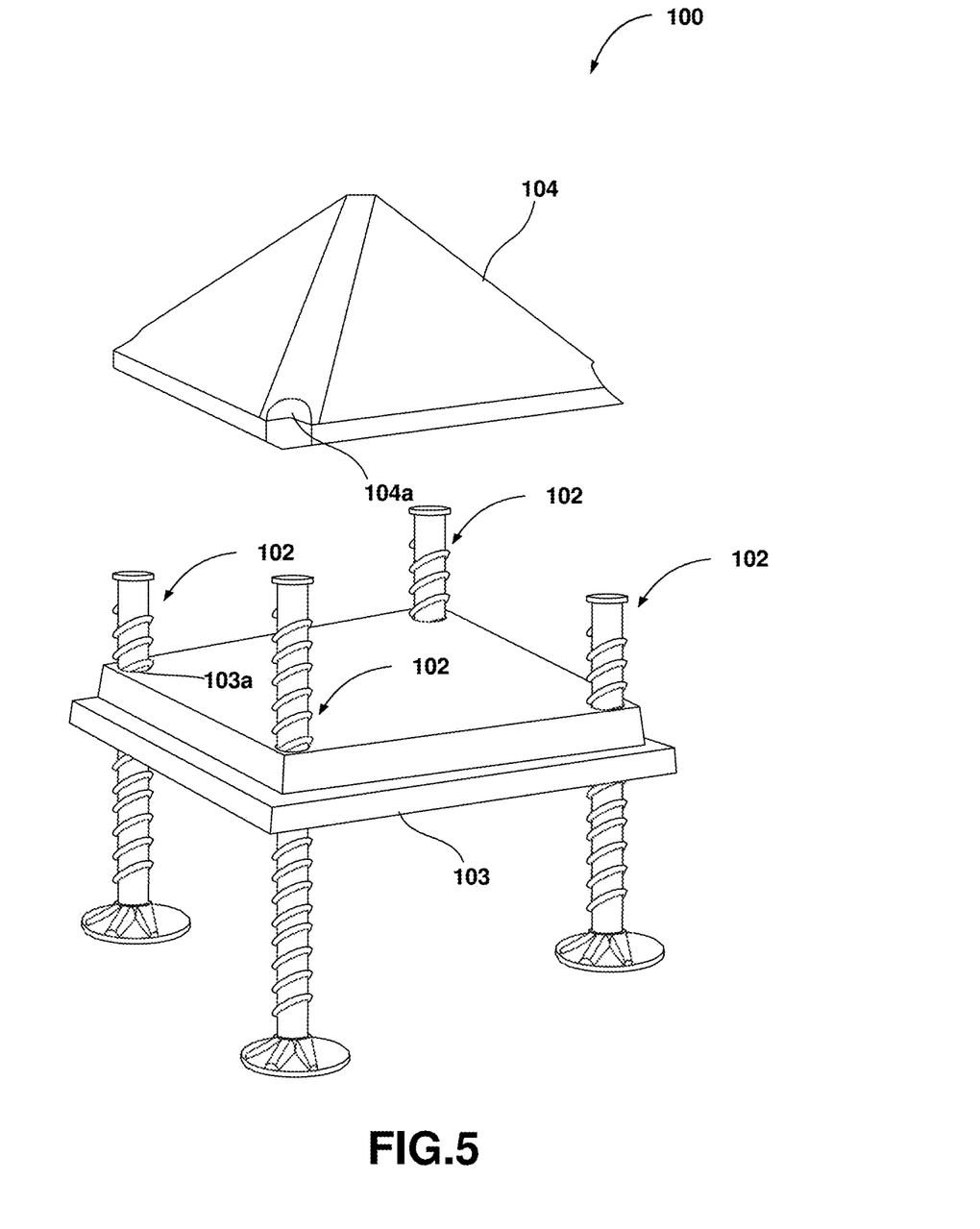
FIG. 5 shows a pyramidal shaped cover exploded out of the brooder heating plate of FIG. 4.
Figure 6A:
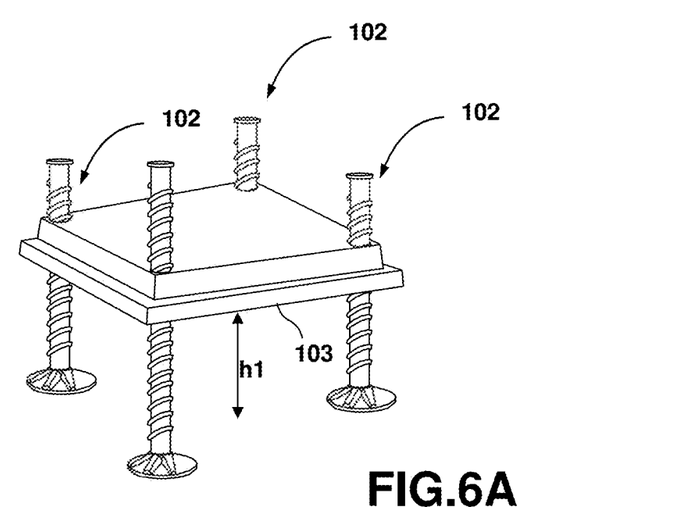
FIGS. 6A-6C shows the brooder heating plate without the pyramidal cover, wherein the brooder heating plate is configured at different height levels h1-h3 with respect to ground surface.
Figure 6B:
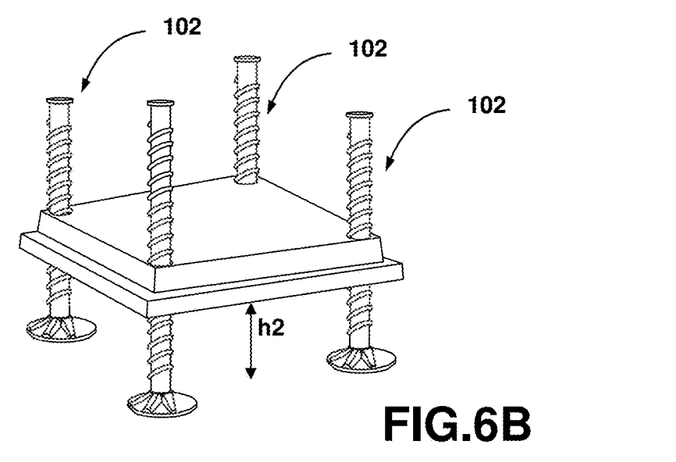
Figure 6C:
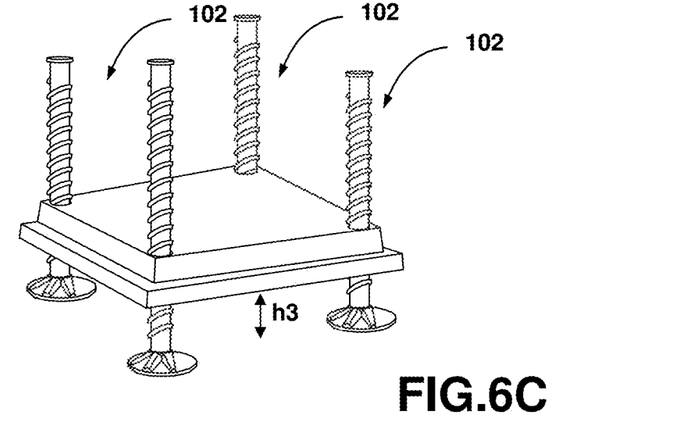
Figure 7:
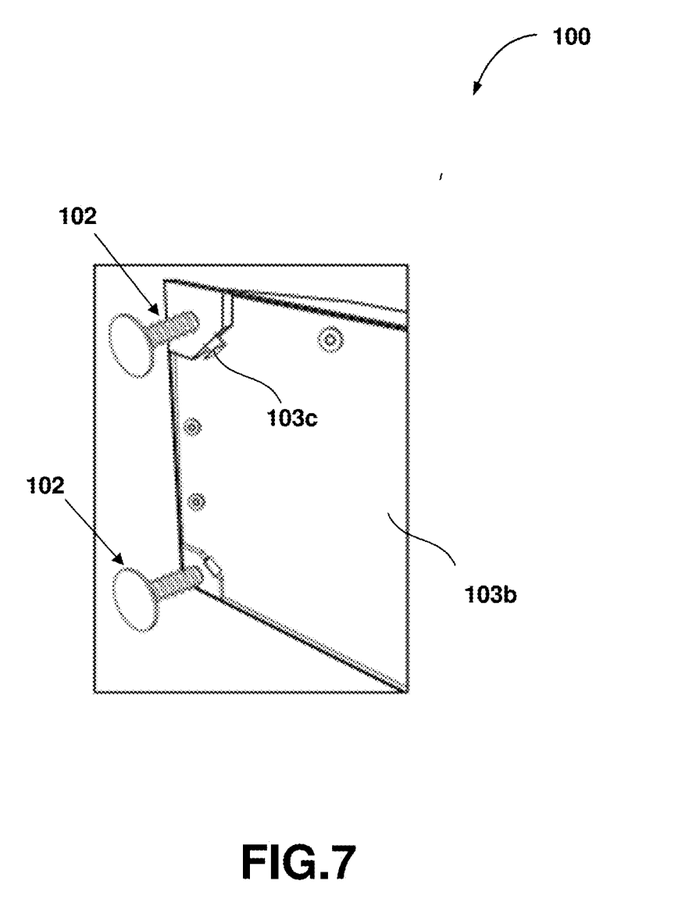
FIG. 7 shows the underside or bottom view of the brooder heating plate to specifically show push buttons that enable ease of sliding legs through the slot and hole pair located on the heating plate and pyramidal cover.

FIGS. 4 and 5 essentially show an exemplary brooder heating plate 100. The brooder heating plate 100 includes a heating plate 103 that may be rectangular or square or circular. In a preferred embodiment, the heating plate 103 is configured to be seen in a square shape, however, it may be configured in the form of a rectangle. The heating plate 103 is in the form of a casing that function by utilizing a radiant heat source embedded therein. The plate 103 distributes the heat evenly across its surface, mimicking the natural warmth provided by a mother hen. The heating plate 103 simulates a hen keeping chicks 120 positioned underside warm and cozy. Chicks 120 stay warm by contact with the warm but not terribly hot. The heating plate 103 further comprises a plurality of slots 103a. In an example embodiment, the hearing plate 103 includes four slots 103a adapted for receiving and retaining the legs 102 of the brooder heating plate 100 as will be described in detail in the description to follow.

The brooder heating plate 100 further includes a protective cover 104 configured on top of the plate 103. The protective cover 104 as seen may be pyramidal in shape. In some embodiment it may be conical in shape and so on. The cover 104 may protect the heating plate 103 from getting dirty from unhygienic poop from hen or chickens or dust and other hazardous materials or water. The cover 104 also comprises a plurality of holes 104a. In an example embodiment, the cover 104 includes four holes 104a adapted for receiving and retaining the legs 102 of the brooder heating plate 100 as will be described in detail in the description to follow.

Figure 8A:
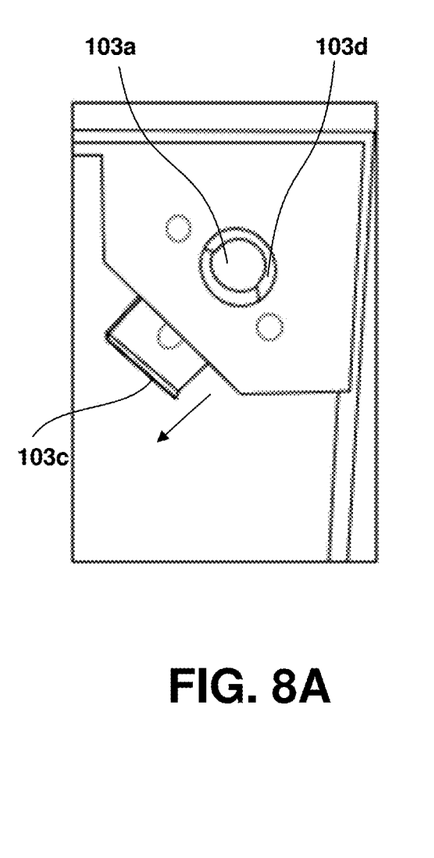
FIGS. 8A and 8B shows an enlarged view of the push button in two different states of operation.
Figure 8B:
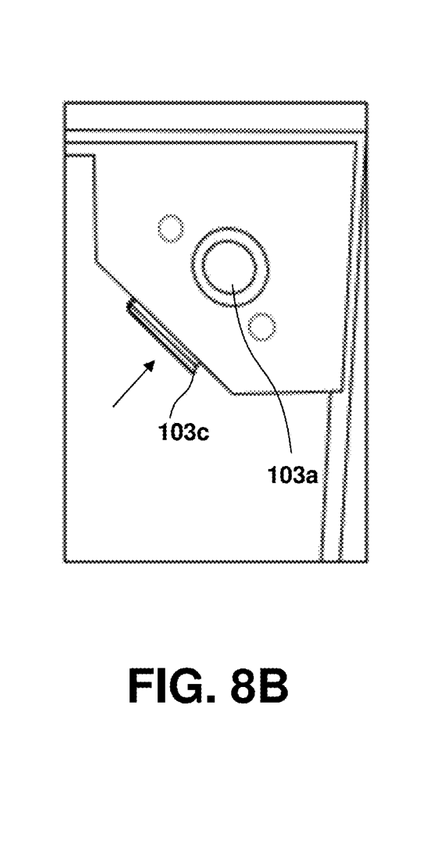

The legs 102 of the brooder heating plate 100 are essential aspects of this invention. Each of the legs 102 is the same leg 102 described above with respect to FIGS. 2 and 3. Each of the legs 102 is adapted to be inserted into the slot 103a and hole 104a pair of the plate 103 and the cover 104. In assembly, when the cover 104 is configured on top of the plate 103, the slots and the holes of the plate 103 and cover concentrically align to form four slot and hole pairs for the legs 102 to pass therethrough. Each of the legs 102 is inserted through the slot 103a of the plate 103 and then made to pass through the correspondingly aligned hole 104a of the cover 104. In operation, firstly a push button 103 provided/located on the plate 103 is pushed or pressed inward (in the direction of an arrowhead shown in FIG. 8B) to open the slot 103a, then top-end 102c of the elongated body 102 of the leg 102 is inserted through the slot 103a and the leg 102 is passed through the slot 103a and the corresponding hole 104a until a desired length of the leg 102 ejects out of the slot 103a and then the pressure applied on the push button 103c is released or depressed. As soon as the push button 103c is released the push button 103c regains its initial position as seen in FIG. 8A (indicated by the arrow). When the push button 102c is released after setting up the desired height for the brooder heating plate 100, an engaging member 103d (FIG. 8A) associated with the push button 103c gets engaged within a groove/space 102j (seen in FIG. 3) between a pair of spiral threads 102b providing a resistance to the movement. It is to be noted that leg 102 is not shown inserted through the slot 103a in FIGS. 8A and 8B for the sake of clarity.

With the proposed legs 102 configuration, changing the height for the brooder heating plate 100 is comparatively made easier especially when a user or caretaker of chicks has to slightly change (with some millimeters) the height of the heating plate 103 from the ground surface or bedding to accommodate growing chicks and provide optimal warmth.

In all the known traditional brooder heating plates available in the marketplaces or sold by different vendors as shown in FIGS. 1A-1B, the legs are pushed through the slots and holes 13 of the plate 11 by activating or pushing the push button and that's only the option to adjust the height of the brooder heating plate 100. However, with the current leg 102 design, users can even skip using the push button 103c to adjust the height (especially when the height is to be adjusted by a very small length), the height can simply be adjusted by directly rotating the legs 102 within the slot and hole pair (103a, 104a). In an example embodiment, the user can hold the foot 102g (or other portions) of the leg 102 and rotate the same anticlockwise to increase the height of the brooder heating plate 100. Likewise, when the user needs to decrease the height of the brooder heating plate 100, the user can rotate the legs 102 clockwise. The traditional legs 14 (FIG. 1) do not allow such adjustment since the traditional legs 14 include different sets of the threads and each set is a distance apart from the other set thereby restricting the rotational motion of the legs within the slot 103*a* and hole 104*a* combination of the plate 103 and cover 104.

Thus, it is the key advantage of the current leg 102 that it not only allows the user to adjust the height of the brooder heating plate 100 by using the push button 103*c* but it also allows a user to manually adjust the height of the brooder heating plate 100 by way of manually rotating the legs 102 in respective slot and hole pair (103*a*, 104*a*) when the plate 103 and protective covers are assembled forming the brooder heating plate 100 of FIGS. 4 and 5. If the cover 104 is not used in the embodiment, then the legs 102 just need to pass through the slots 103*a* of the plate 103 and not the holes 104*a* of the cover 104.

The various components of the embodiments of the height adjustable brooder heating plate 100 the present invention are similar and interchangeable. It is obvious to the one skilled in the art that the various components, and parts of the height brooder heating plate 100 of one embodiment of the present invention could be considered for other embodiments with little or no variation. Further, the material used for the construction of the height adjustable brooder heating plate 100 and various components such as legs 102, cover 104, heating plate 103 and so on may include any material such as but not limited to: metal, plastic, wood, and so on. The term 'desired height' in the context of the present invention refers to a height (from the ground level) suitable for the cheeks, chickens, or other small birds for which the brooder heating plate 100 may be utilized to provide optimum temperature. The desired height may be as low as 1" or 5" or 6". The maximum height of the brooder heating plate 100 will depend upon the length of the legs 102.

It should be understood according to the preceding description of the present invention that the same is susceptible to changes, modifications, and adaptations, and that the said changes, modifications, and adaptations fall within the scope of the appended claims.

What is claimed is:

1. A brooder heating plate (100), comprising:
    a heating plate (103) functioning by utilizing a radiant heat source embedded therein, the heating plate (103) distributes the heat evenly across its surface, wherein the heating plate (103) comprises a plurality of slots (103*a*);
    a cover (104) configured on top of the heating plate (103) to protect the heating plate (103), the cover (104) comprises a plurality of holes (104*a*);
    a plurality of legs (102), each of the leg (102) comprising
        an elongated body (102*a*) comprising an externally configured spiral winding (102*b*) extending from a top end (102*c*) to a bottom end (102*d*) of the elongated body (102*a*);
        a cap (102*e*) configured at the top end (102*c*) of the elongated body (102*a*);
        a foot (102*g*) configured at the bottom end (102*d*) of the elongated body (102*a*);
    wherein, each of the legs (102) is insertable into a slot (103*a*) and a hole (104*a*) combination of a heating plate (103), and the cover (104) and is capable of sliding therethrough to adjust the height of the brooder heating plate (100) by using a push button (103*c*) configured underside the heating plate (103), and/or by rotating the leg (102) engaged within the slot (103*a*).

2. The brooder heating plate (100) of claim 1, wherein the heating plate (103) is at least square, circular or rectangular in shape, and the cover 104 is at least pyramidal or conical in shape.

3. The brooder heating plate (100) of claim 1, wherein the spiral winding (102*b*) is continuously wound around the elongated body (102*a*) of the leg (102) and wherein each of the successive spiral windings (102*b*) is equidistant from each other.

4. The brooder heating plate (100) of claim 1, wherein the cap (102*e*) comprises a pair of prongs (102*f*) extending therefrom and is insertable into the top end (102*c*) of the elongated body (102*a*).

5. The brooder heating plate (100) of claim 1, wherein the foot (102*g*) comprises a base (102*h*), and a post (102*i*) extending upwardly from the center of the base (102*h*).

6. The brooder heating plate (100) of claim 1, wherein the push button (103*c*) when pressed allows the leg (102) to freely slide within the slot (103*a*), and when depressed allows the leg (102) inserted inside the slot (103*a*) to be locked.

7. The brooder heating plate (100) of claim 6, wherein an engaging member (103*d*) engages within the space (102*j*) located along the length of the elongated body (102*a*) to provide resistance to the movement of the leg (102) when the push button (103*c*) is depressed.

* * * * *